United States Patent
Ford

(10) Patent No.: US 9,413,181 B2
(45) Date of Patent: Aug. 9, 2016

(54) WEARABLE POWER SUPPLY COMPRISING A MASTER CELL AND A SLAVE CELL

(75) Inventor: Timothy D. F. Ford, Beaconsfield (CA)

(73) Assignee: THE FLEWELLING FORD FAMILY TRUST, Beaconsfield (CA)

( * ) Notice: Subject to any disclaimer, the term of this patent is extended or adjusted under 35 U.S.C. 154(b) by 1082 days.

(21) Appl. No.: 13/091,719

(22) Filed: Apr. 21, 2011

(65) Prior Publication Data

US 2011/0260686 A1 Oct. 27, 2011

Related U.S. Application Data

(60) Provisional application No. 61/327,165, filed on Apr. 23, 2010.

(51) Int. Cl.
*H02J 7/00* (2006.01)

(52) U.S. Cl.
CPC .............. *H02J 7/0054* (2013.01); *H02J 7/0003* (2013.01); *H02J 7/0013* (2013.01); *H02J 7/0045* (2013.01); *Y10T 307/625* (2015.04)

(58) Field of Classification Search
USPC .................................................. 320/103, 110
See application file for complete search history.

(56) References Cited

U.S. PATENT DOCUMENTS

| | | | |
|---|---|---|---|
| 3,579,075 A | 5/1971 | Floyd | |
| 3,930,889 A | 1/1976 | Ruggiero et al. | |
| 4,303,876 A * | 12/1981 | Kelly, III | H02J 7/0003 320/110 |
| 5,015,546 A | 5/1991 | Dulaney et al. | |
| 5,683,831 A * | 11/1997 | Baril et al. | 429/96 |
| 6,914,412 B2 * | 7/2005 | Wang | H02J 7/0054 320/103 |
| 7,264,479 B1 * | 9/2007 | Lee | H01R 11/30 439/39 |
| 2006/0270471 A1 * | 11/2006 | Matthiessen | H04L 12/403 455/575.6 |
| 2007/0247105 A1 * | 10/2007 | Krieger et al. | 320/104 |
| 2007/0257637 A1 * | 11/2007 | Hankel et al. | 320/110 |
| 2008/0143294 A1 * | 6/2008 | Phelps | H02J 7/0045 320/110 |
| 2009/0096399 A1 * | 4/2009 | Chen | H01M 10/44 318/441 |
| 2010/0109605 A1 | 5/2010 | Nakasho et al. | |

OTHER PUBLICATIONS

Nicholas Barry et al., "Supercharged Battery Scavenger", Proceedings of The National Conference on Undergraduate Research (NCUR) 2006, The University of North Carolina at Asheville, Apr. 6-8, 2006.

* cited by examiner

*Primary Examiner* — Richard Isla Rodas
*Assistant Examiner* — David V Henze-Gongola
(74) *Attorney, Agent, or Firm* — Hugh Mansfield

(57) ABSTRACT

There is disclosed a universal power pack, power supply and battery harvesting device. Generally, each comprises a receptacle for receiving at least one battery or battery pack having a different shape and/or nominal output voltage. A controller circuit is provided for regulating the output voltages and/or currents of the battery or batteries with the regulated voltage and current available at an output. The devices allow other devices to be powered or recharged, or batteries to be recharged. In a particular embodiment, a master cell and slave cell are provided wherein the slave cell continues to power attached devices when connection with the master cell is not available.

7 Claims, 7 Drawing Sheets

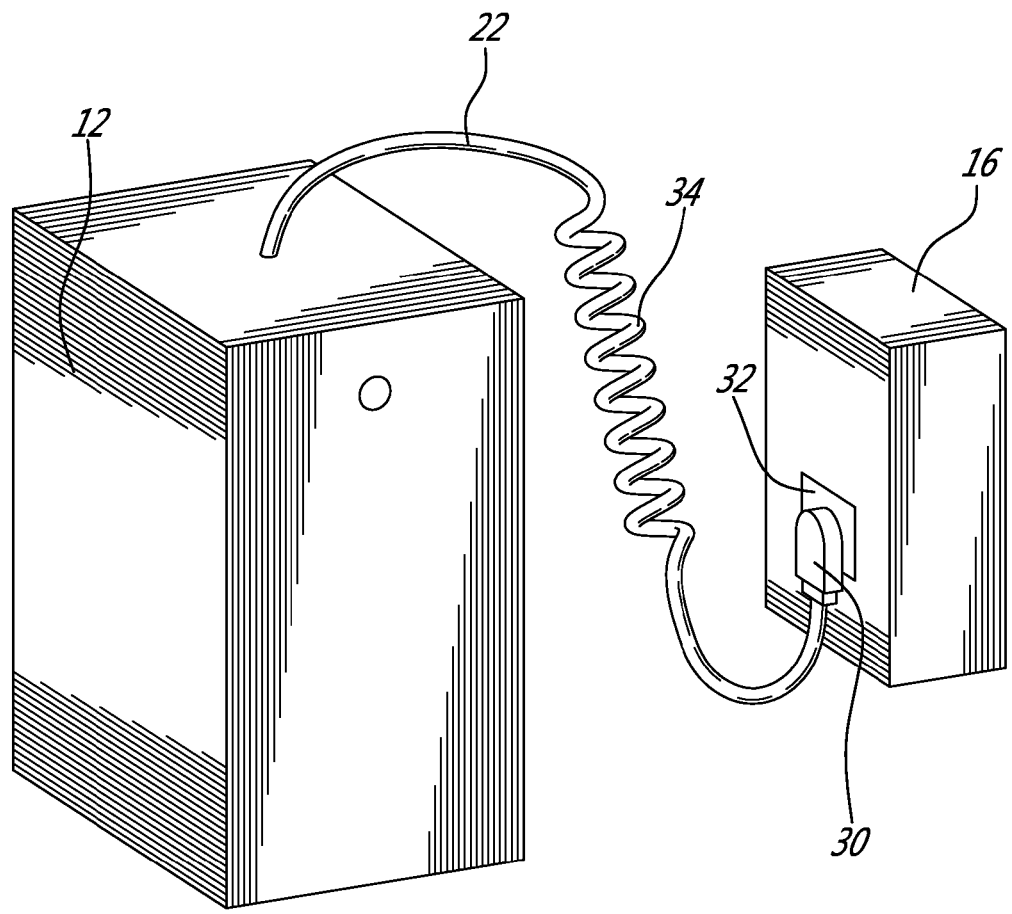

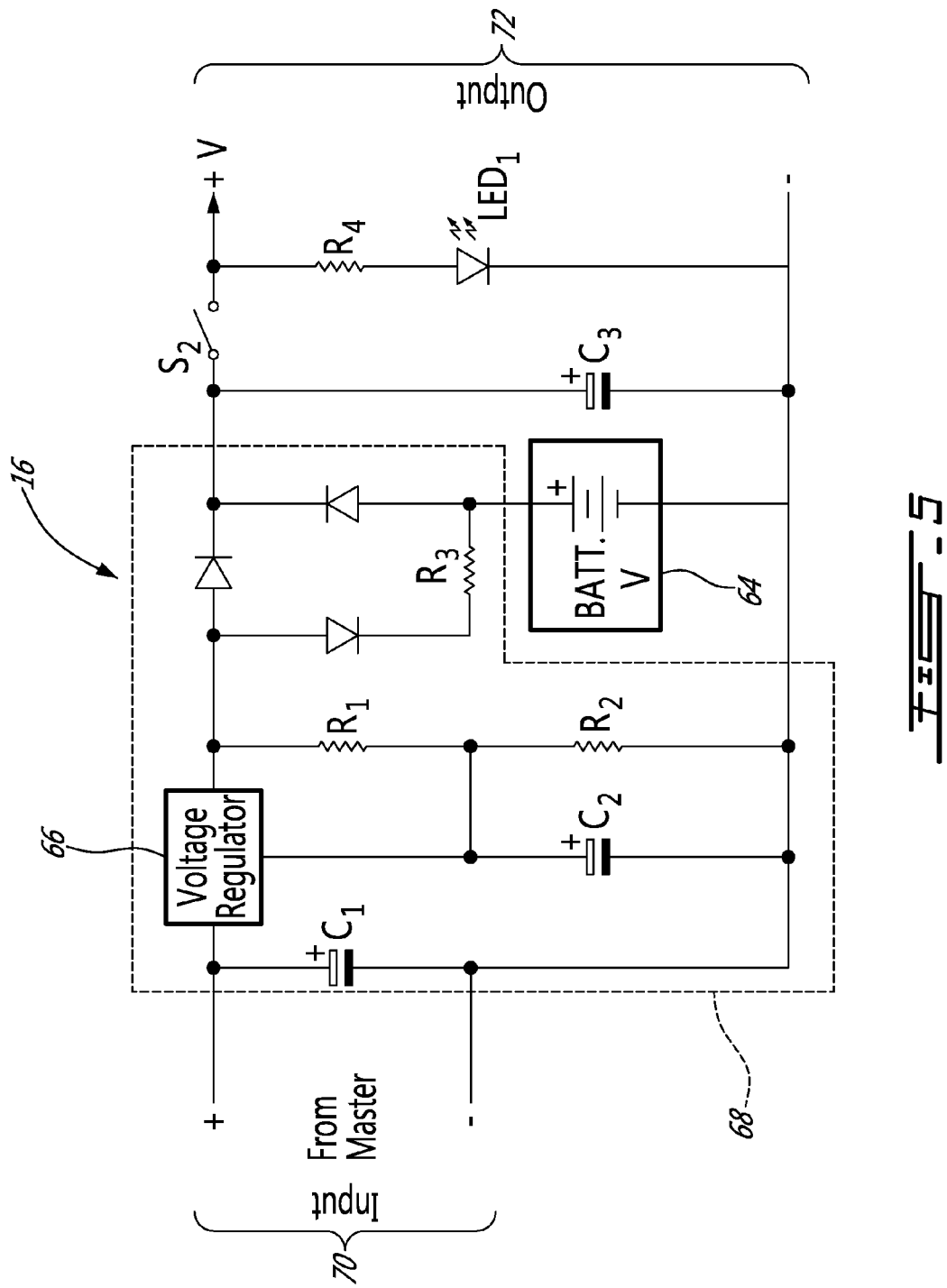

WEARABLE POWER SUPPLY COMPRISING A MASTER CELL AND A SLAVE CELL

CROSS REFERENCE TO RELATED APPLICATIONS

This application claims benefit, under 35 U.S.C. §119(e), of U.S. provisional application Ser. No. 61/327,165, filed on Apr. 23, 2010 which is incorporated herein in their entirety by reference.

FIELD OF THE INVENTION

The present invention relates to a universal battery pack and powering system.

BACKGROUND OF THE INVENTION

The modern combat soldier is equipped with a variety of body and helmet mounted gear, such as identification lights, communication devices and the like, which require power. Typically, power for such devices is provided by a battery which is carried in the soldier's back pack or on an epaulet or attached to the rear of the soldier's helmet.

One drawback of such prior art back pack power packs is that the soldier regularly becomes separated from his back pack and therefore power to the helmet or soldier mounted devices is lost. On the other hand, one drawback of the helmet mounted power packs is that they are relatively cumbersome and add additional stress to the soldiers neck.

What is needed, therefore, and an object of the present application, is a power system which provides power to solider or helmet mounted devices for those periods of time when the back pack becomes separated from the soldier, but does not add strain to the soldier's neck when worn.

Additionally, many of the devices currently used in the field require a variety of batteries in order to be operated. Typically these batteries are swapped periodically in order to ensure that a battery does not expire in the field. As a result, a solider or unit is typically left with a large number of partially spent batteries. What is need therefore, and also an object of the present application, is a universal battery pack that can harvest and reuse the remaining energy from such partly spent batteries.

SUMMARY OF THE INVENTION

In order to address the above and other drawbacks there is disclosed a universal power pack for powering a device. The power pack comprises a master cell comprising a receptacle for receiving at least one battery, a controller circuit for regulating an output voltage and current of the at least one battery, the regulated voltage and current available at an output of the master cell, a slave cell comprising an input, a recharging circuit connected to the input for recharging a rechargeable cell with power available at the input, a power output connected to the device and a switching circuit for directing a selected one of the power available at the power input and power available from the rechargeable cell to the power output, and a conductor releasably interconnecting the master cell output and the slave cell input. When power is available at the slave cell input, the switching circuit interconnects the salve cell input with the slave cell output and when power is not available at the slave cell input, the switching circuit interconnects the rechargeable cell with the slave cell output.

Also, there is disclosed a universal battery power supply, comprising a receptacle configured for receiving one of a plurality of different battery packs, each of the battery packs comprising a different nominal voltage, and a controller circuit for receiving the different nominal voltage of the one of the plurality of battery packs and providing an output, wherein a voltage available at the output remains substantially at a predetermined value regardless of the different nominal voltage.

Additionally, there is disclosed a universal battery harvesting device for recharging a rechargeable battery with at least one partially depleted battery having a nominal voltage, the device comprising a receptacle configured for receiving the at least one partially depleted battery, the at least one battery having a nominal voltage, and a recharging circuit comprising an input configured for attachment between poles of the at least one partially depleted battery, an output configured for attachment between poles of the rechargeable battery and a recharging circuit connected between the input and the output. In operation the recharging circuit boosts the nominal voltage to a recharge voltage, the recharge voltage available between poles of the rechargeable battery, and regulates a flow of current between poles of the rechargeable battery.

BRIEF DESCRIPTION OF THE DRAWINGS

In the appended drawings:

FIG. 2A is a plan view of a power system comprising a master and slave power supplies in accordance with an illustrative embodiment of the present invention;

FIG. 5 is a schematic diagram of slave power supply in accordance with an illustrative embodiment of the present invention.

DESCRIPTION OF ILLUSTRATIVE EMBODIMENTS

The present invention is illustrated in further details by the following non-limiting examples.

Figure 1:
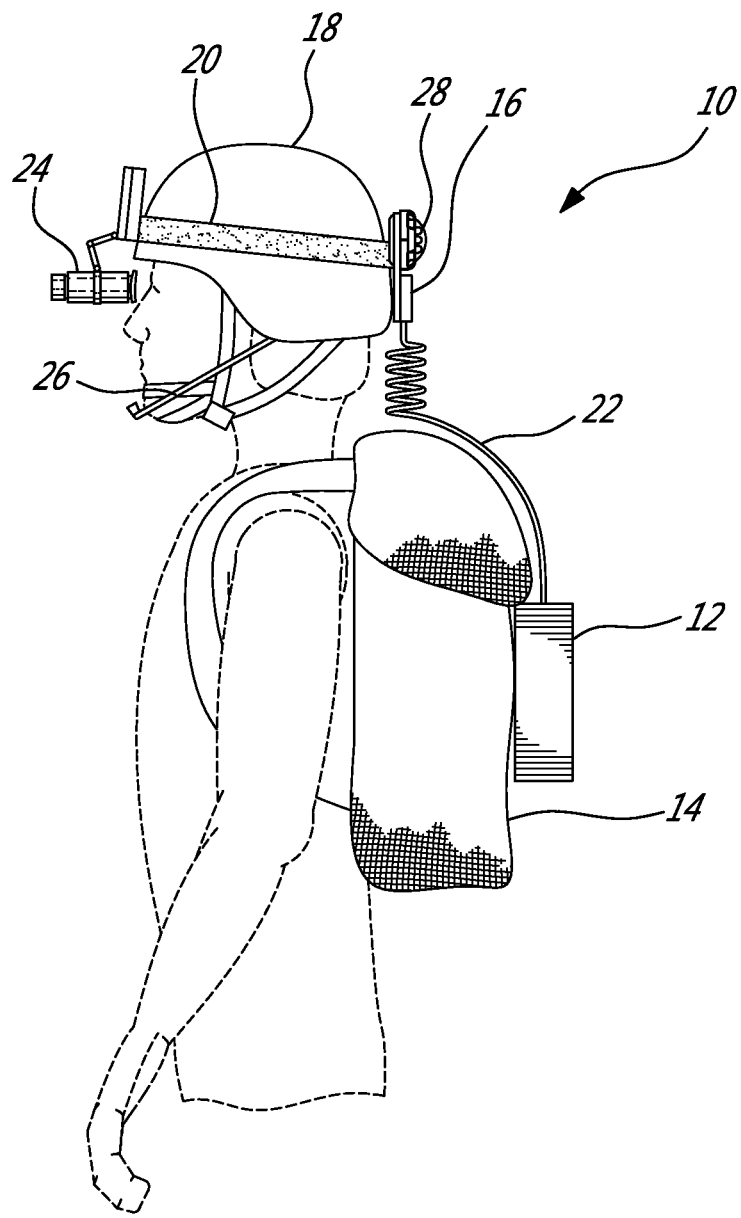
FIG. 1 is a side plan view of a solider wearing a power system in accordance with an illustrative embodiment of the present invention.

Referring now to FIG. 1, the powering system, generally referred to using the reference numeral 10, will now be described. The power system 10 is comprised of a relatively heavy master power cell 12 mounted on or within a back pack 14 and a relatively small and lightweight slave power cell 16 mounted to the soldier's helmet 18, for example via an accessory attachment on an equipment halo 20 or the like. The slave power cell 16 is preferably of a sufficiently light weight such that it does not place undue stress on the neck of the wearer or significantly change the moment of the soldier's helmet when attached. The master cell 12 is electrically interconnected to the slave 16 cell via an easily separable insulated conductor 22. The slave cell 16 provides power for a variety of helmet mounted devices including, for example, night vision equipment 24, communications gear 26, identification lights 28 or the like, either through direct power connections shown, or via for example conductors integrated into the halo 20.

Figure 2B:
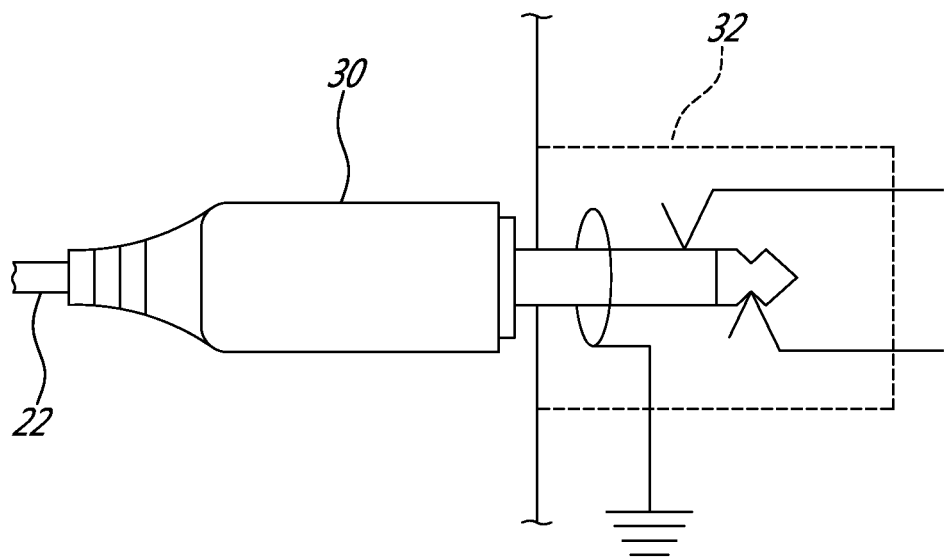
FIG. 2B is a side sectional view of a connector interconnected with a receptacle of a slave power supply in accordance with an illustrative embodiment of the present invention.

Referring now to FIGS. 2A and 2B, as discussed above the master cell 12 is interconnected with the slave cell 16 via the insulated conductor 22. Illustratively the conductor 22 is hard wired into the master cell 12 and terminated with a 3.5 mm TRS connector jack 30 or the like which interconnects with slave cell 16, for example, via insertion into an appropriate 3.5 mm receptacle 32 incorporated into the slave cell 16. Illustratively the conductor 22 includes a coiled portion 34 for the allowing conductor 22 to stretch to some degree without inadvertently pulling the jack 30 from the receptacle 32.

Figure 2C:
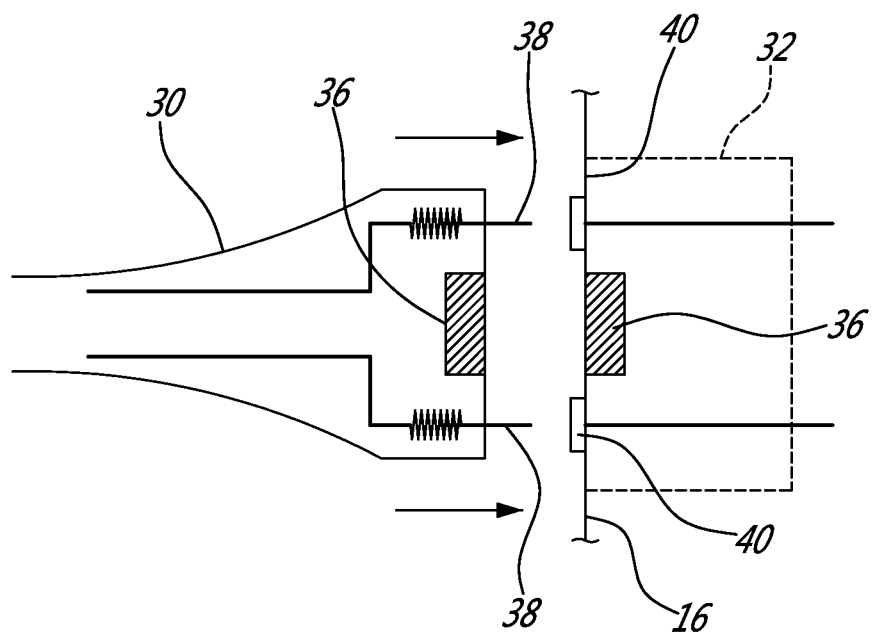
FIG. 2C is a side sectional view of a connector positioned for interconnection with a receptacle of a slave power supply in accordance with an alternative illustrative embodiment of the present invention.

Referring now to FIG. 2C, alternatively, the jack 30 can be held in conductive contact with the receptacle 32 through the use of mutually attracting magnets as in 36. In this regard, the jack 30 is not inserted into the receptacle 32 but rather comprises spring loaded contacts 38 which are held in conductive contact with corresponding contact plates 40. In the event the conductor 22 becomes snagged on a branch or the like, jack 30 will easily breakaway from the receptacle 32. The alternative embodiment generally has the additional advantage in that it prevents the ingress of dirt and water and the like into the slave cell 16.

Referring back to FIG. 2A, although the master cell 12 is disclosed as delivering power to the slave cell 16 via an electrical conductor 22, in a particular embodiment, and given relative proximity of the master cell 12 to the cell slave 16, an inductive/RF mode of energy transfer could also be used with the addition of suitable inductive/RF coupling means between the master cell 12 and the cell slave 16.

Figure 3A:
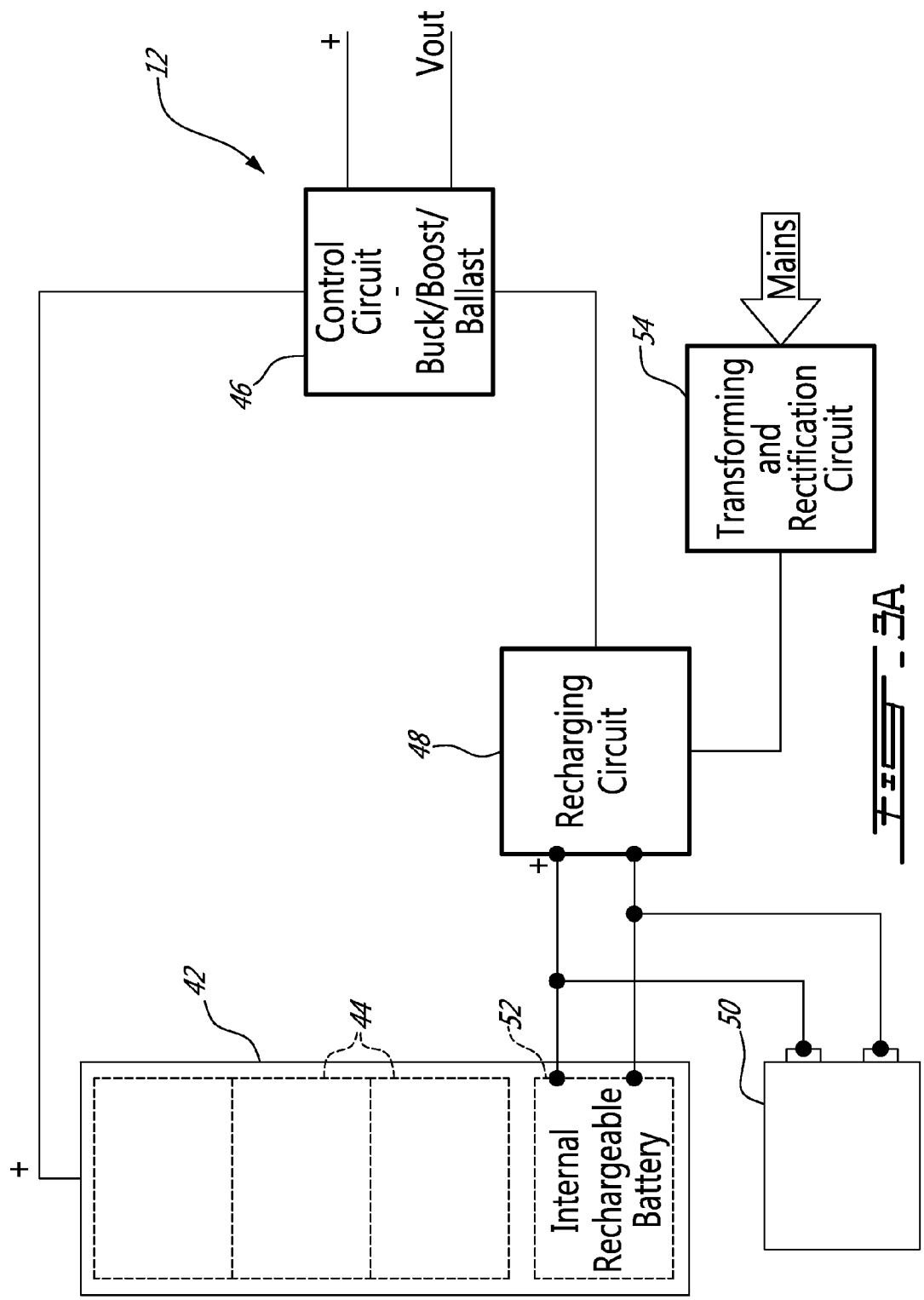
FIG. 3A is a schematic diagram of master power supply in accordance with an illustrative embodiment of the present invention.

Referring now to FIG. 3A in addition to FIG. 1, the master cell 12 is used generally to power devices 24, 26, 28 attached to the soldier for extended durations via the conductor 22 and as such is equipped with a requisite capacity cell or cell bank 42. Batteries/cells in the cell bank 42 could include, for example, standard alkaline cells 44 with sizes such as AA, AAA, C, D, CR123, 9 Volt transistor or the like, or could be comprised of one or more custom battery sizes or battery packs depending on the devices being powered.

Still referring to FIG. 3A, the output of the cell bank 42 is fed into a controller circuit 46 which outputs a constant voltage for powering the devices regardless of the output voltages of the cells 44 within the cell bank 42. Additionally, and as will be discussed in more detail below, the master cell 12 provides power for charging and maintaining charge of a rechargeable cell within the slave cell 16, also via the conductor 22. The controller circuit 46 comprises, for example, a boost/buck converting portion for raising or lowering the voltages output by the cells 44 to a constant voltage $V_{OUT}$, a voltage regulator portion and an active ballast portion for sensing the current required to drive the one or more attached devices and limit the current as necessary. Additionally, the controller circuit 46 illustratively senses a number of characteristics of the cells 44 including, for example, their current charge, orientation, temperature and whether or not they are shorted (for example, due to the infiltration of water or the like into the cell compartment). In a particular embodiment, the controller circuit 46 could include a switch for user selected output voltages. For example, in a particular embodiment, and in addition to or instead of powering a slave cell, the master cell 12 could be used to provide auxiliary back up power to a user's cell phone, hand held radio or the like. Alternatively, a plurality of outputs (not shown) could be provided on the master cell 12 at different voltages (for example, 5.5V, 9V and 12V), each for powering one of a plurality of devices, including the slave cell 16, having different input voltage requirements.

Still referring to FIG. 3A, in addition to powering devices via Vout, the master cell 12 of the present application can also include a recharging circuit 48 for recharging rechargeable cell(s) 50 for use in other devices (not shown). Typically the controller circuit 46 would include a switch or the like for switching between powering mode and recharging mode. In a particular embodiment the cells 44 can include one or more batteries which can be harvested using the controller circuit 46 and recharging circuit 48 and used for recharging the rechargeable cell 50. In use, the battery harvesting circuit is used to harvest left over energy in typically partially depleted batteries. Indeed, as discussed above, in order to ensure continued operation, in many cases batteries discarded/replaced before they are fully spent, and therefore represent a source of otherwise unused energy which can be taken advantage of in the field. The boost/buck converter serves to raise (or lower) the voltage of the partially spent cells 44 such that it is at a suitable level for recharging the rechargeable cell(s) 50.

Still referring to FIG. 3A, in an alternative embodiment, the cell bank 42 comprises one or more rechargeable cells 52. Provision could also be made for a transforming and rectification circuit 54 as well as a removable mains plug (not shown), for attaching the master cell 12 to an external source of recharging power when the powering system 10 is not in use in the field.

Figure 3B:
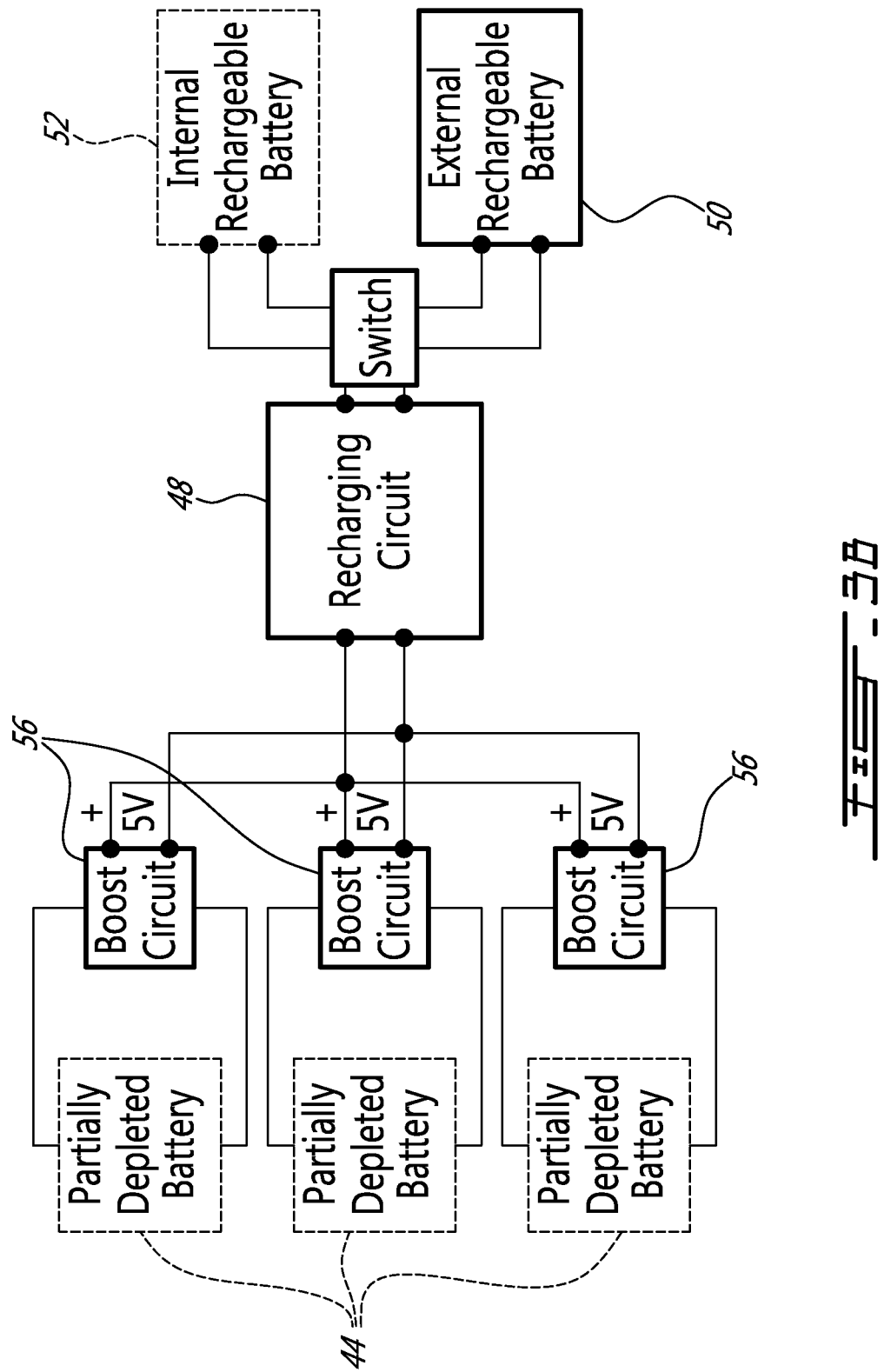
FIG. 3B is a detailed schematic diagram of the recharging circuit of FIG. 3A and in accordance with an illustrative embodiment of the present invention.

Referring now to FIG. 3B, in a particular embodiment, as known in the art when batteries are arranged in series, use of batteries of different levels of depletion (i.e. cell mismatching) may lead to the case where an undepleted battery attempts to recharge a depleted battery. In order to address this, the batteries being harvested can be arranged in parallel. Additionally, as the individual batteries typically have a nominal output voltage insufficient (for example 1.5 volts) to adequately drive a recharging circuit, a boost circuit 56 is provided for each battery being harvested in order to raise its output voltage to a uniform value which is suitable for recharging, illustratively 5 volts. Also, the nominal output voltages of the batteries may vary depending on level of depletion and type. The output of each of the boost circuits as in 56 is fed into the recharging circuit 48 which regulates the output current such that it is suitable for recharging the rechargeable cell(s) 50 or the internal rechargeable battery 52 as selected.

Referring back to FIG. 3A in addition to FIG. 3B, in a particular embodiment the cells 44 could be arranged into selectable banks, such that only a portion of the cells 44 are used for powering external devices while another portion of the cells are used for the recharging circuit 48.

Figure 4:
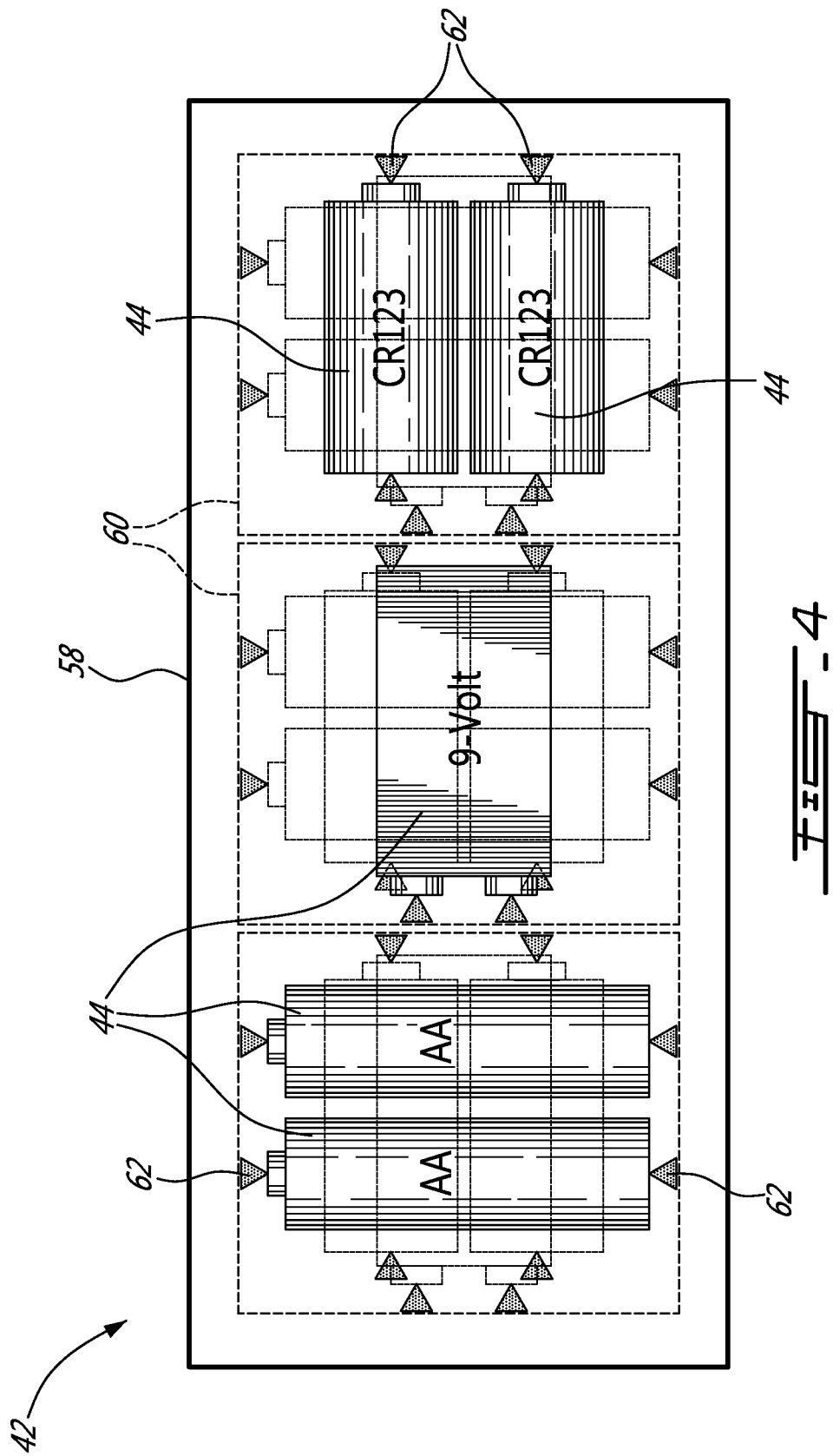
FIG. 4 is a plan view of a master power supply battery compartment in accordance with an illustrative embodiment of the present invention.

Referring now to FIG. 4, as discussed above the cell bank 42 is comprised of a plurality of cells 44. In a particular embodiment, the cells 44 are held within a multi-standard battery compartment 58 comprised of sub-compartments 60 each able to receive and interconnect with batteries of more than one standard. Illustratively batteries of the AA, 9-Volt and CR123 are shown, although other sizes and types of cells could be accommodated with requisite modifications to the shape of the sub-compartments as in 60 and the placement of the connectors as in 62.

Referring now to FIG. 5, the slave cell 16 comprises a rechargeable cell 64 as well as supporting components such as a voltage regulator 66 and other components $R_1, R_2, R_3, C_1, C_2$ and $C_3$ for providing a control circuit 68. The control circuit 68 serves as a circuit for recharging the rechargeable cell 64 as well as providing a pass through such that a power entering the slave cell 16 from the master cell 12 via the conductor 22 and the slave input 70 is available at the slave output 72. Additionally, when power from the master cell 12 is interrupted, for example when the jack is removed from the receptacle (respectively references 30 and 32 in FIG. 2), the control circuit 68 ensures that the rechargeable cell 64 provides power across the slave output 72, thereby ensuring uninterrupted supply of power to the devices.

Although the present invention has been described hereinabove by way of specific embodiments thereof, it can be modified, without departing from the spirit and nature of the subject invention as defined in the appended claims.

I claim:

1. A universal power pack for powering a device, the power pack comprising:
    a back-pack mounted master cell comprising a cell bank for receiving at least one battery, a controller circuit for regulating a DC output voltage and current of said at least one battery, said regulated DC voltage and DC current available at an output of said master cell;
    a helmet mounted slave cell comprising an input, a recharging circuit connected to said input for recharging a rechargeable cell with a DC power available at said input, a DC power output connected to the helmet mounted device and a switching circuit for directing a selected one of said DC power available at said DC power input and DC power available from said rechargeable cell to said DC power output; and
    a flexible two conductor cable for releasably interconnecting said master cell output and said slave cell input, said flexible cable further comprising an insulating jacket surrounding said conductors;
    a first interconnection between a first end of said flexible two conductor cable and one of said master cell output and said slave cell input and a second interconnection between a second end of said flexible two conductor cable and another of said master cell output and said slave cell input, said second interconnection comprising a jack and a port, wherein said jack is releasably held in said port such that said second interconnection can be interrupted by pulling said jack away from said port and completed by inserting said jack into said port;
    wherein when said interconnections are completed and power is available at said slave cell input, said switching circuit interconnects said slave cell input with said slave cell output such that the at least one helmet mounted device is powered by a DC power from said master cell and when at least one of said interconnections is interrupted and power is not available at said slave cell input, said switching circuit interconnects said rechargeable cell with said slave cell output such that the at least one helmet mounted device is powered by a DC power from said slave cell.

2. The universal power pack of claim 1, wherein said cell bank is configured for receiving one of a plurality of different battery types each having a different standardized format and nominal voltage, and further wherein a voltage available at said output remains substantially at a predetermined value regardless of said nominal voltage.

3. The universal power pack of claim 1, wherein said cell bank is configured for receiving one of a plurality of different standardized shapes of battery.

4. The universal power pack of claim 1, wherein said master cell comprises a plurality of cell banks, each of said cell banks configured for receiving a plurality of different batteries each having a different standardized shape and nominal voltage, wherein said controller circuit regulates each of said different nominal voltage such that said voltage available at said output remains substantially at a predetermined voltage.

5. The power pack of claim 2, wherein each of said plurality of different battery types is elongate and each of said receptacles is configured for receiving a battery of a first type in a first orientation and a battery of a second type in a second orientation at right angles to said first orientation.

6. The universal power pack of claim 1, wherein said jack is a TRS plug and said port is a TRS socket.

7. The universal power pack of claim 1, wherein releasable contact between said jack and said port is maintained using a magnet.

* * * * *